DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JUNE 22, 1971

887 O.G. 1048

T887,029

PREPARATION OF SILVER HALIDE MATERIALS

Cynthia Geer Ulbing, Fairport, N.Y. (% Eastman Kodak Co., Kodak Park Division, Rochester, N.Y. 14650)

Filed Aug. 31, 1970, Ser. No. 68,524
**Int. Cl. G03c *1/08, 1/12***
U.S. Cl. 96—127
No Drawing. 13 Pages Specification

Low concentrations of certain quaternated trinuclear complex cyanine I, trinuclear complex merocyanine II and quaternated tetranuclear complex cyanine dyes III prevent reduction sensitization when present during silver halide grain formation, especially when precipitating silver halide grains under conditions which normally result in reduction sensitization. In certain embodiments, the effect is obtained with concentrations of the dyes well below the effective spectral-sensitizing concentrations, e.g., of the order of 0.1 to 25 mg. of dye per mole of silver halide formed in the precipitation. Examples of useful dyes include:

(I)

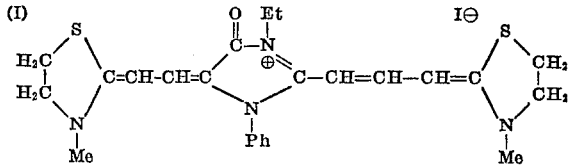

(II)

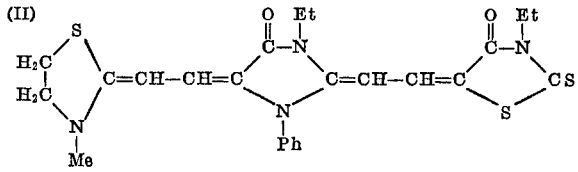

and (III)

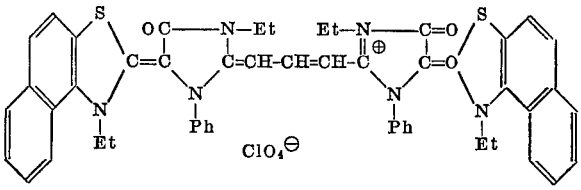

In one embodiment of this invention, silver halide grains can be prepared, in the presence of said dyes at a pH number of above 4 and preferably above 6 and/or a pAg of less than 9.0, which are substantially free of reduction sensitization, especially when making cubic-regular grains.